(12) United States Patent
Chmelka et al.

(10) Patent No.: US 8,808,807 B2
(45) Date of Patent: Aug. 19, 2014

(54) FUNCTIONALIZED INORGANIC FILMS FOR ION CONDUCTION

(75) Inventors: Bradley F. Chmelka, Goleta, CA (US); George L. Athens, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 1753 days.

(21) Appl. No.: 11/566,104

(22) Filed: Dec. 1, 2006

(65) Prior Publication Data

US 2007/0191499 A1 Aug. 16, 2007

Related U.S. Application Data

(60) Provisional application No. 60/741,439, filed on Dec. 1, 2005.

(51) Int. Cl.
*B01D 69/00* (2006.01)
(52) U.S. Cl.
USPC .......................................... 427/402; 427/243
(58) Field of Classification Search
None
See application file for complete search history.

(56) References Cited

U.S. PATENT DOCUMENTS

| | | | | |
|---|---|---|---|---|
| 6,042,959 | A | * | 3/2000 | Debe et al. ..................... 429/492 |
| 6,248,469 | B1 | * | 6/2001 | Formato et al. ............... 429/494 |
| 6,326,326 | B1 | | 12/2001 | Feng et al. |
| 6,818,259 | B1 | | 11/2004 | Koontz |
| 2003/0205853 | A1 | | 11/2003 | Yang et al. |
| 2004/0144726 | A1 | | 7/2004 | Chmelka |
| 2006/0083962 | A1 | * | 4/2006 | Takekawa et al. .............. 429/13 |

OTHER PUBLICATIONS

Bartl et al., "Synthesis and luminescence properties of mesostructured thin films activated by in-situ formed trivalent rare earth ion complexes," Chem. Commun., 2002, 2474-2475 (First published as an Advance Article on the web Oct. 4, 2002).*

Melosh et al., "Mesostructured Silica/Block Copolymer Composites as Hosts for Optically Limiting Tetraphenylporphyrin Dye Molecules," J. Phys. Chem. B 2004, 108, 11909-11914 (Published on Web Jul. 17, 2004).*

* cited by examiner

*Primary Examiner* — William Phillip Fletcher, III
(74) *Attorney, Agent, or Firm* — John P. O'Banion

(57) ABSTRACT

Novel membranes based on functionalized porous inorganic materials for ion exchange and conduction have been synthesized and characterized. The preparation procedure of these new membranes involves the synthesis of porous inorganic films, into which hydrophilic moieties are incorporated along the interior pore surfaces of the inorganic framework. Ion-conducting species are grafted into the pores via reactions with surface groups of the inorganic framework to allow for ion transport through the pore network.

5 Claims, 14 Drawing Sheets

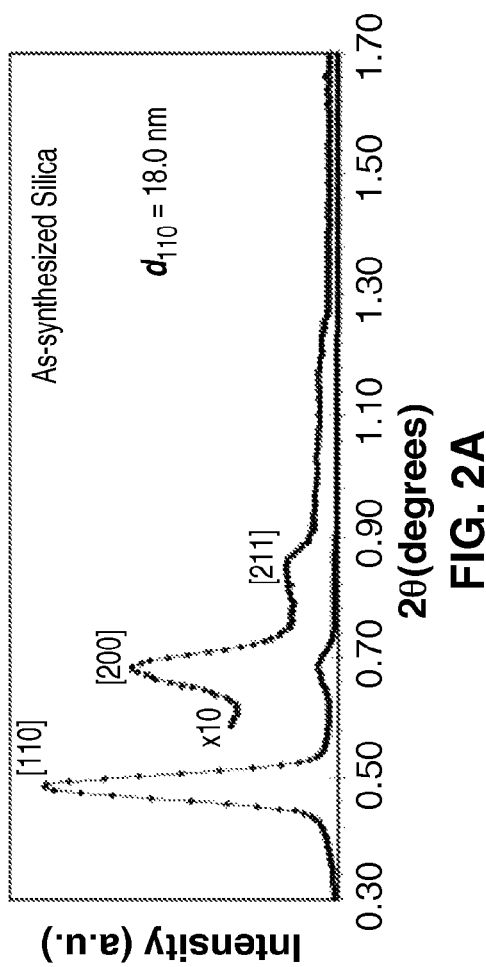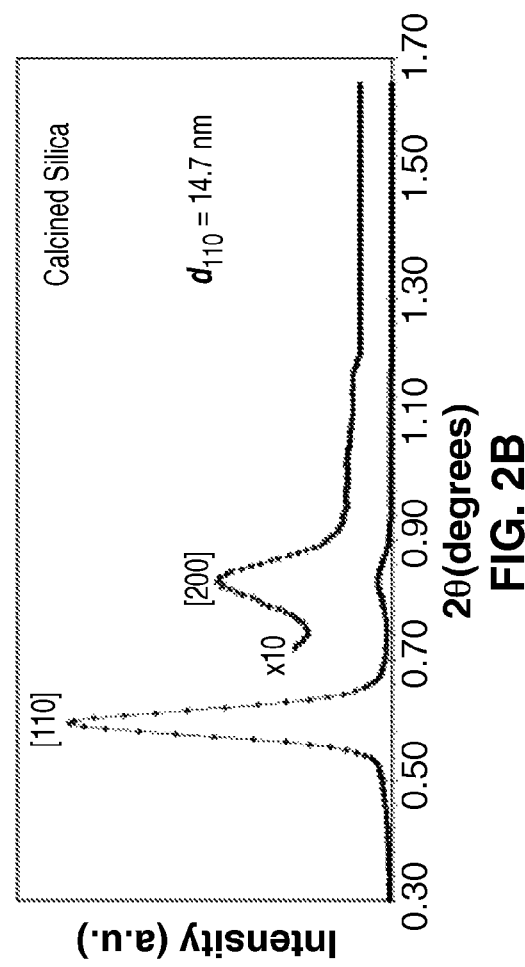
FIG. 2A
FIG. 2B

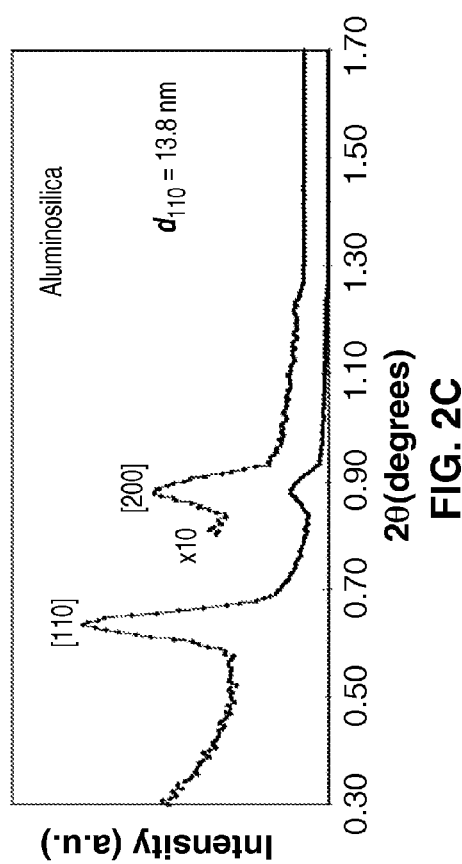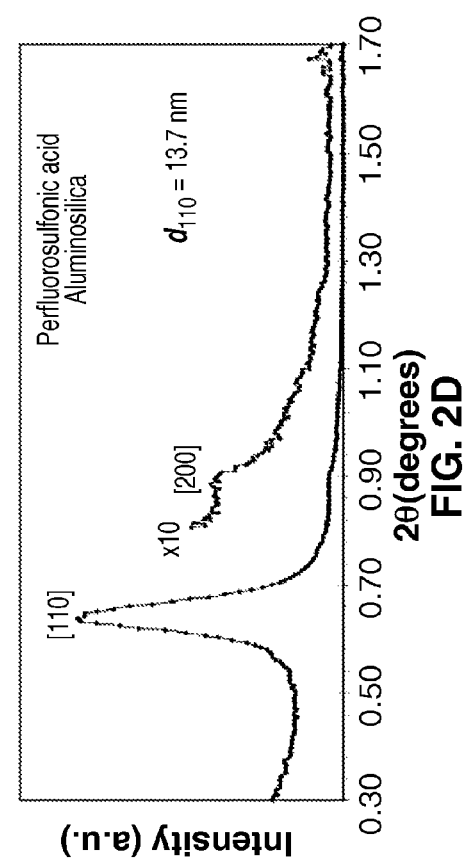

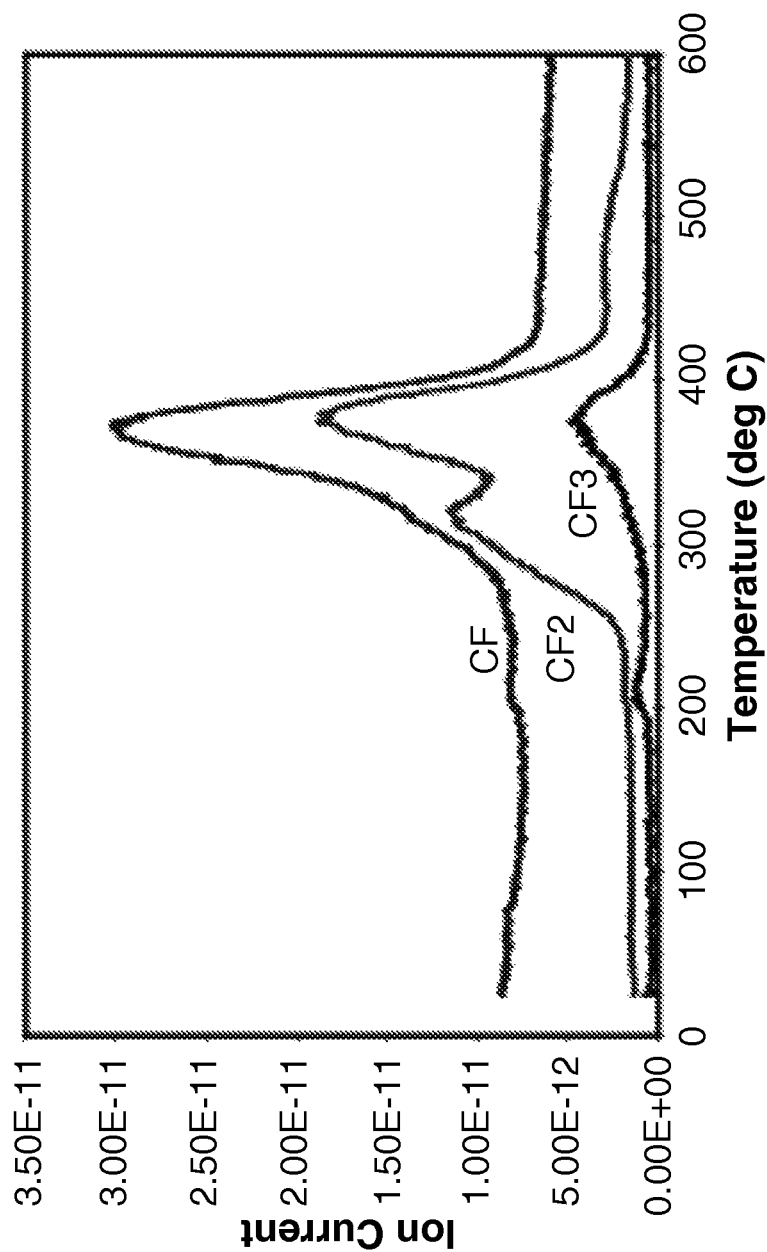

FUNCTIONALIZED INORGANIC FILMS FOR ION CONDUCTION

STATEMENT REGARDING FEDERALLY SPONSORED RESEARCH OR DEVELOPMENT

This invention was made with Government support under Grant No. DAAD19-01-0-0121, awarded by the U.S. Army Research Office MURI program; Grant No. DGE-9987618, awarded by the IGERT program of the National Science Foundation; and Grant No. DMR05-20415, awarded by the MRSEC Program of the National Science Foundation. The Government has certain rights in this invention.

CROSS-REFERENCE TO RELATED APPLICATIONS

This application claims priority to U.S. Provisional Application Ser. No. 60/741,439, filed on Dec. 1, 2005, incorporated herein by reference in its entirety.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to ion exchange membranes, and more particularly to functionalization of porous materials to produce proton exchange membranes that maintain conductivity at temperatures above 100° C.

2. Description of Related Art

Research on proton exchange membranes (PEMs) has focused on improving proton conductivity at elevated temperatures (e.g., >100° C.). Current state-of-the-art proton exchange membranes are the product of over 30 years of steady improvement to performance and lifetime of perfluorosulfonic acid (PFSA) or other organic polymer membranes. These polymer membranes generally contain hydrophilic regions of interconnected acidic (e.g., sulfonic acid) clusters surrounded by a hydrophobic matrix (e.g., a fluorinated polymer, such as perfluorinated ethylene). Under atmospheric pressure and near 100% relative humidity, for example, PFSA membranes have been reported to possess proton conductivities up to 0.1 S/cm at 80° C. However, unless a pressurized feed stream (~8 atm) containing saturated water vapor is used, the membrane will dehydrate and lose sufficient proton conductivity at temperatures above 100° C. Therefore, PFSA membrane implementation into PEM fuel cells requires relatively low-temperature (<80° C.) operation.

Substantial efforts have been made to develop new ion conducting membranes, especially proton exchange membranes, for use at temperatures above 100° C. Most research in this area focuses on the development of (1) sulfonated polymer membranes, (2) acid-base polymer membranes, (3) modified PFSA and sulfonated polymer membranes containing inorganic particles, or (4) hybrid organic/inorganic membranes. Sulfonated hydrocarbon polymers such as polysulfones, polyether-etherketone (PEEK), polyimides, polyphenylsulfide, and polybenzimidazoles (PBI) have generally been suggested as low cost alternatives to PFSA membranes under low-temperature operation. A few polymers, including sulfonated PBI and poly(arylene ether sulfone) (BPSH), have shown relatively high proton conductivity and thermal stability at elevated temperatures. However, most of these sulfonated hydrocarbon polymers exhibit poor chemical stabilities compared to PFSA polymers. Acid-base polymer membranes have also been investigated. Polymers bearing basic sites such as ether, alcohol, imine, amide, or imide groups act as a solvent in which strong acids readily dissociate and allow for high proton conductivity. $H_3PO_4$-doped PBI polymers have obtained proton conductivity values of ~$10^{-2}$ S/cm at temperatures between 100-200° C. and show good thermal and chemical stability.

In addition to the development of new entirely polymeric materials, inorganic-organic composite membranes, such as those containing hydrophilic zeolite, silica, or titania particles introduced into proton conductive polymers tend to retain water at higher temperatures and display modestly improved proton conductivities. PFSA composites containing $SiO_2$, zirconium oxide, titanium oxide, and zirconium phosphate particles have all shown enhanced water retention and allow for reduced humidification at operating temperatures in the range of 100-120° C. Likewise, improved water retention and proton conductivity have been obtained through the incorporation of inorganic particles into other proton exchange membrane materials. Alternatively, porous inorganic particles have been functionalized by proton conducting species or filled with proton conducting polymers. While these approaches have generally increased bulk hydrophilicity of the respective materials, they have not led to appreciable improvements in bulk proton conductivity at temperatures above 100° C., largely because the continuous polymeric host matrices present the same hydration-dependent conduction barriers as in the non-composite materials.

Another method of incorporating inorganic materials into a polymer matrix involves directly copolymerizing metal alkoxides, such as tetraethoxysilane or organic substituted alkoxides, with polymers to produce covalent bonding at the organic/inorganic interface. These materials offer the benefit of low temperature sol-gel processing, good thermal and chemical stability, and proton conductivity properties of $10^{-3}$ S/cm to $10^{-2}$ S/cm at operating temperatures up to 160° C., but only under saturated humidity conditions and with disordered structures, including the absence of well-defined pores or channels.

BRIEF SUMMARY OF THE INVENTION

Mesoporous inorganic oxides are easily processed into film morphologies containing continuous nanoscale pore networks using sol-gel techniques, and these films possess the pore surface properties necessary for high temperature water retention. The surfaces of the pore networks in these films can be modified with strong acid moieties to produce thermally and chemically stable proton-conductive membranes that maintain their properties at temperatures above 100° C.

Novel membranes based on functionalized porous inorganic materials for high temperature ion exchange and conduction have been synthesized and characterized. The preparation procedure of these new membranes involves the synthesis of porous inorganic films, into which hydrophilic moieties are incorporated along the interior pore surfaces of the inorganic framework. Ion-conducting species are grafted into the pores via reactions with surface groups of the inorganic framework to allow for ion transport through the pore network. Such functionalized porous inorganic films possess water retention and ion conductivity at elevated temperatures (>100° C.), making them suitable candidates for use as, for example, proton exchange membranes in Proton Exchange Membrane Fuel Cells or batteries operated at temperatures above 80° C.

An aspect of the invention is a method of functionalizing a porous material that comprises introducing hydrophilic species into the porous material, wherein the hydrophilic species create a hydrophilic porous network.

Another aspect of the invention is a method of functionalizing a porous material that comprises introducing ion-conducting species into the porous material, wherein the ion-conducting species create ion-conducting networks.

Another aspect of the invention is a method of functionalizing a porous material that comprises introducing hydrophilic species into the porous material and introducing ion-conducting species to pore surfaces in the porous material.

In one embodiment according to these aspects, the introduction of hydrophilic species comprises incorporating Brønsted or Lewis acid sites along interior pore surfaces in the porous material, such as by use of aluminum atoms as a hydrophilic species. In other embodiments, the ion-conducting species is an acid-containing species, such as a perfluorosulfonic acid species.

In another embodiment, the porous material is a film, a fiber, a powder, or a monolith having well-defined channel dimensions, for example, in the mesoscopic size regime (approximately 2-50 nm) or larger, and which may be arranged in periodic arrays. Alternatively, such well-defined channels may be non-ordered, for example, in worm-like structures.

Other embodiments comprise repeating the step of introducing the hydrophilic species or ion-conducting species at least twice, and another embodiment comprises introducing multiple types of ion-conducting species during successive repeating steps.

Another aspect of the invention is a method of functionalizing a porous material, comprising incorporating chemical moieties along interior pore surfaces of the porous material and grafting ion-conducting species to pore surfaces in the porous material, wherein the ion-conducting species create ion-conducting networks. In one embodiment, the chemical moieties are selected from the group consisting of: hydrophilic species, hydrophobic species, chemically reactive species, or optically responsive species.

A still further aspect of the invention is a functionalized porous material, comprising a hydrophilic membrane having pore surfaces and ion-conducting groups incorporated onto said pore surfaces in the hydrophilic membrane, wherein ion-conducting networks are created through the functionalized porous material. In one embodiment, the pores are of molecular scale, nanoscale, mesoscale, microscale, or macroscale dimensions. In another embodiment, the pores are of varied dimension and the dimension of the pores is chosen from the group consisting of molecular scale, nanoscale, mesoscale, microscale, or macroscale. In still another embodiment, the ion-conducting networks are filled with at least one functional species; wherein the functional species comprise hydrophilic species, hydrophobic species, ion-conducting species, reactive species, or optically responsive species.

Yet another aspect of the invention is a method of functionalizing a porous material, comprising: introducing functional species into the porous material; introducing functional species to pore surfaces in the porous material; and introducing at least one additional functional species into the remaining pore volumes; wherein the functional species comprise hydrophilic species, hydrophobic species, ion-conducting species, reactive species, or optically responsive species. In other embodiments of this aspect, the additional functional species comprise acid-containing species or the additional functional species comprise fluorine-containing acid species.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 2A is an X-ray diffraction pattern of the as-synthesized Im$\bar{3}$m cubic mesoporous silica film prepared using amphiphilic $EO_{106}PO_{70}EO_{106}$-triblock copolymer structure-directing agents.

FIG. 2B is an X-ray diffraction pattern of the calcined Im$\bar{3}$m cubic mesoporous silica film prepared using amphiphilic $EO_{106}PO_{70}EO_{106}$-triblock copolymer structure-directing agents.

FIG. 2C is an X-ray diffraction pattern of the calcined cubic mesoporous silica film after grafting aluminum species onto the silica framework.

FIG. 2D is an X-ray diffraction pattern of aluminosilica film after a perfluorosulfonic acid grafting treatment.

FIGS. 8A-8B are mass spectrometry analyses of the exhaust stream from the thermogravimetric analysis of perfluorosulfonic-acid-grafted aluminosilica films.

DETAILED DESCRIPTION OF THE INVENTION

Referring more specifically to the drawings, for illustrative purposes the present invention is embodied in the systems, methods, and materials generally shown in FIG. 1A through FIG. 10. It will be appreciated that the systems and materials may vary as to configuration and as to details of the parts, and that the methods may vary as to the specific steps and sequence, without departing from the basic concepts as disclosed herein.

Figure 1B:
FIG. 1B is a transmission electron micrograph of the material shown in FIG. 1A.
Figure 1A:
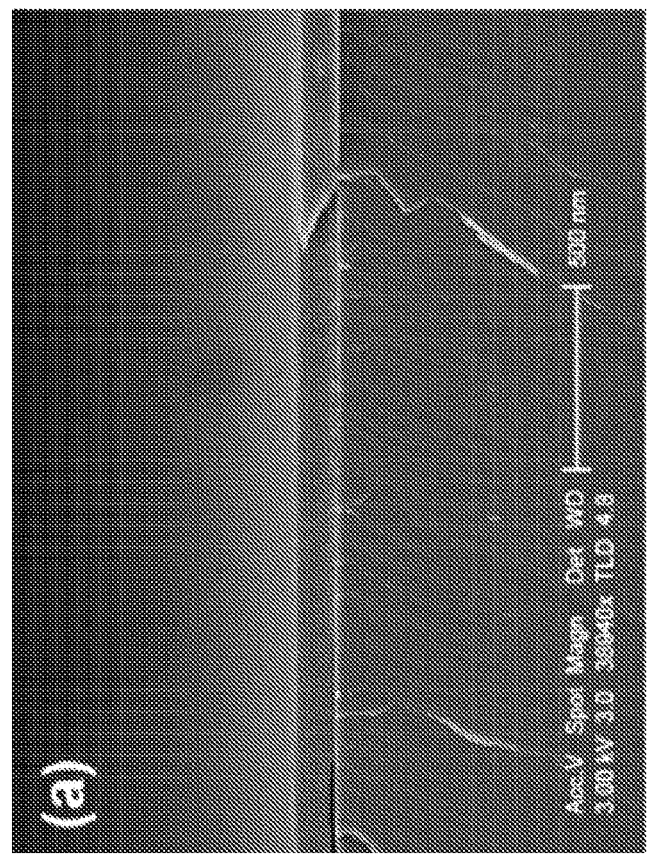
FIG. 1A is a scanning electron micrograph of a dip-coated mesostructured silica thin film supported on a polished silicon substrate.
Figure 1D:
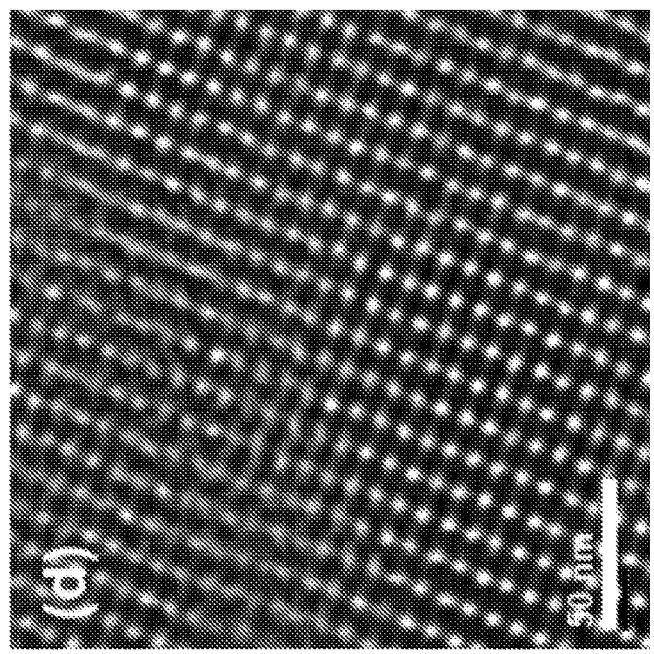
FIG. 1D is a transmission electron micrograph of the material shown in FIG. 1C.
Figure 1C:
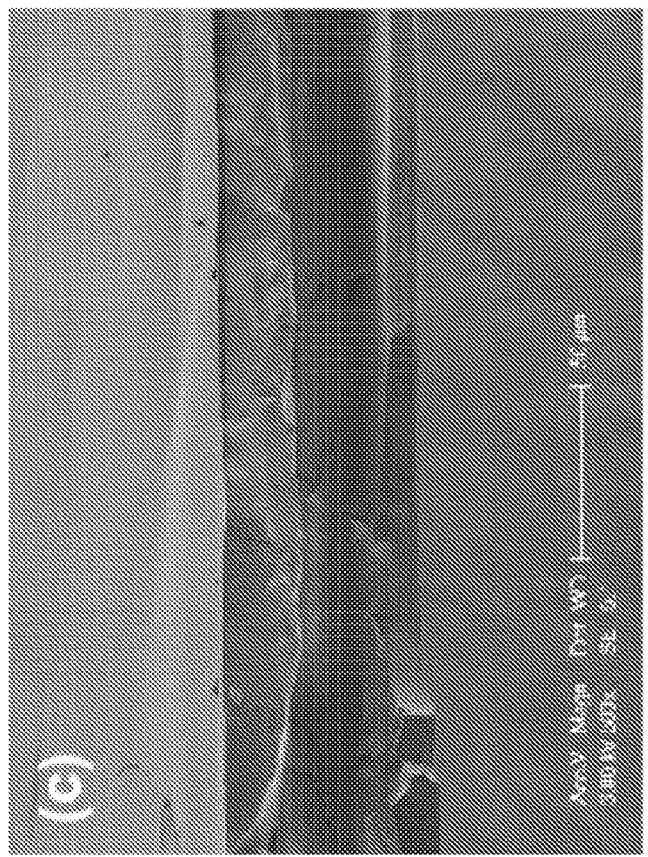
FIG. 1C is a scanning electron micrograph of a solvent-extracted, free-standing mesostructured silica film.

Porous inorganic materials can be synthesized by using a range of structure-directing agents, such as ionic alkyltrimethylammonium surfactants (e.g., CTAB or CTAC), nonionic surfactants (e.g., poly(ethylene oxide)-b-poly(propylene oxide)-b-poly(ethylene oxide) triblock copolymers and Brij surfactants), solid particles (e.g., polystyrene, poly(methyl methacrylate), or silica spheres), microemulsions, macroscopic phase separation (e.g., oil/water mixtures), or foams. Network-forming inorganic precursors, such as hydrolyzed metal oxides, are typically added to a solution of the structure-directing agents. For example, a sol-gel solution containing PEO-PPO-PEO triblock copolymer species, soluble metal oxide precursors, water, and ethanol solvent can be used to prepare porous oxide thin films by dip-coating the sol-gel solution onto substrates. Transparent and continuous silica thin films containing porosity can be formed into typical thicknesses ranging between 200 nm and 2 μm (FIG. 1A). In addition, the same sol-gel solution can be poured into a mold, and after the simultaneous solvent evaporation and hydrolyzed metal alkoxide polymerization, free-standing films of various thicknesses can be obtained (FIG. 1C). These porous films may exhibit highly ordered pore networks, such as the body-centered micellar cubic ($Im\overline{3}m$ space group) mesostructures, but they may also possess randomly interconnected pore pathways. The degree of ordering of the film is typically determined by transmission electron microscopy and small-angle X-ray diffraction. For example, the TEM images in FIGS. 1B and 1D clearly show cubic packing of the block copolymer aggregates. The cubic mesostructure is further confirmed by the XRD pattern in FIG. 2A. The diffraction peaks are assigned to the (110), (200), and (211) peaks associated with body-centered cubic packed arrays. The structure-directing agents can be subsequently removed from the films through calcination or solvent extraction to generate porous films with surface areas ranging from approximately 50 $m^2$/g to 1000 $m^2$/g. This large surface area can be modified with various moieties to impart desired bulk properties in the film.

The films shown in FIGS. 1A-1D were prepared using an ethanol/water solution containing amphiphilic $EO_{106}PO_{70}EO_{106}$ as block copolymer structure-directing agents and hydrolyzed tetraethyoxysilane.

Figure 3:
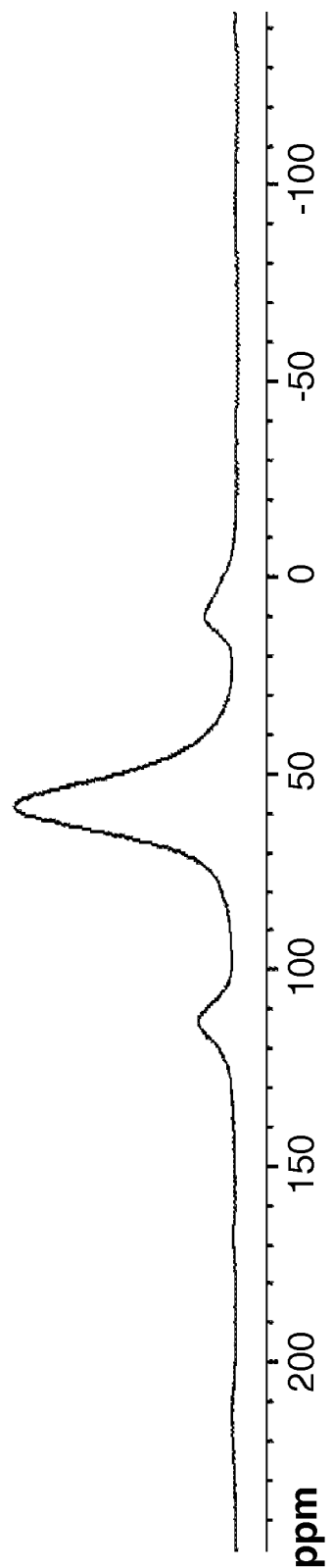
FIG. 3 is a single-pulse $^{27}Al$ MAS NMR spectrum showing four-coordinated aluminosilica sites in the silica film.
Figure 4:
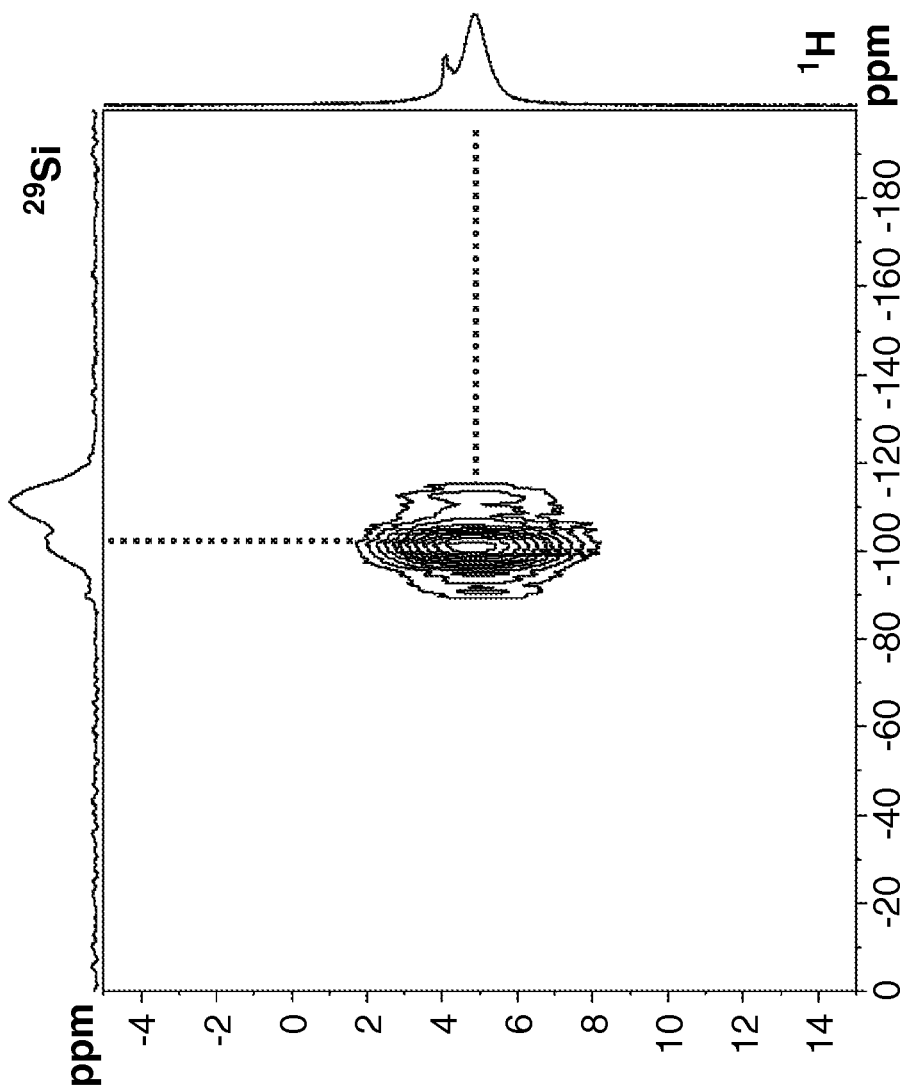
FIG. 4 is a two-dimensional $^{29}Si\{^1H\}$ HETCOR spectrum of a perfluorosulfonic acid grafted aluminosilica film, with separate single-pulse $^{29}Si$ and $^1H$ spectra shown on the corresponding axes.

To increase the water retention in the porous inorganic films, hydrophilic species, such as silica, alumina, niobia, or aluminosilica, are incorporated into the inorganic framework along the pore surfaces. The formation of Brønsted acid sites in the framework increases the acidity and hydrophilicity of the material. For example, treatment of the mesoporous silica film with an alkaline solution containing soluble aluminum species yields an aluminosilica film that has four-coordinated Al—O—Si sites (e.g., Brønsted or Lewis acid sites) incorporated on the surface of the silica framework. As shown in FIG. 3, the quantity of four-coordinated Al sites in the film is determined by single-pulse $^{27}$Al MAS NMR. The peaks at 113 ppm, 5 ppm, and 9 ppm correspond to AlN, four-coordinated Al, and six-coordinated Al, respectively. About 90% of the incorporated aluminum atoms in the film possess approximately a tetrahedral coordination, while the remaining aluminum atoms have closer to octahedral coordination corresponding to framework aluminum atoms that are coordinated additionally with adsorbed water molecules or that are extra-framework species in the form of macroscopically phase-separated $Al_2O_3$. Two-dimensional HETeronuclear chemical shift CORrelation (HETCOR) NMR spectroscopy establishes unambiguously that a substantial fraction of the six-coordinated Al atoms are interacting strongly with adsorbed water, consistent with the increased hydrophilicity of the film. Correlated signal intensity in the $^{29}Si\{^{1}H\}$ HETCOR spectrum in FIG. 4 shows that four-coordinated framework $^{29}$Si sites are interacting with water protons in the sample. Specifically, cross-peaks associated with chemical shift correlations between the protons of water and the $^{29}$Si species that are covalently bonded to framework $^{27}$Al species through an oxygen bridge are clearly evident in FIG. 4. The corresponding experimental conditions are: 10 kHz spinning rate, 3.6 μs 90° $^{1}$H pulse, 1 s recycle delay, and 2096 scans for each of the 64 $t_1$, increments.

Figure 5:
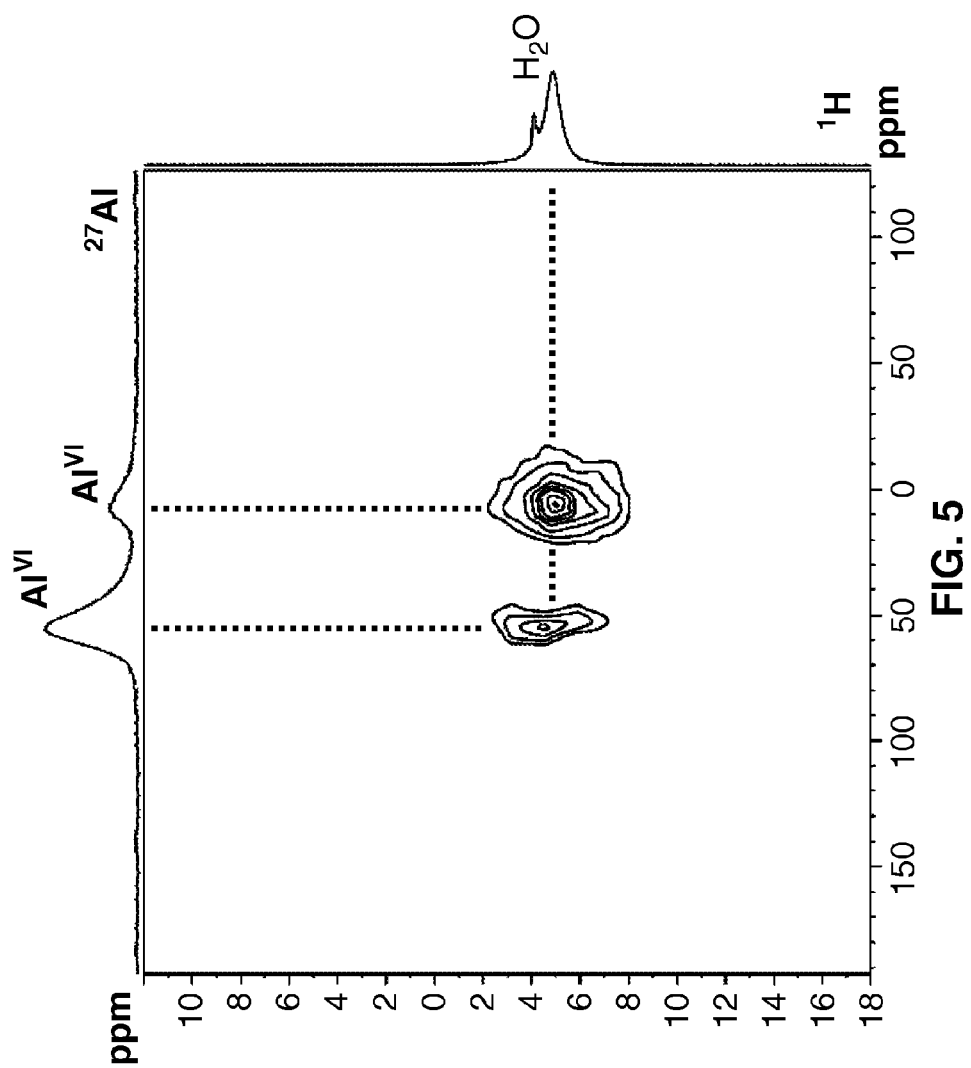
FIG. 5 is a two-dimensional $^{27}Al\{^1H\}$ HETCOR spectrum of a perfluorosulfonic-acid-grafted aluminosilica film, with separate single-pulse $^{27}Al$ and $^1H$ spectra shown on the corresponding axes.
Figure 6:
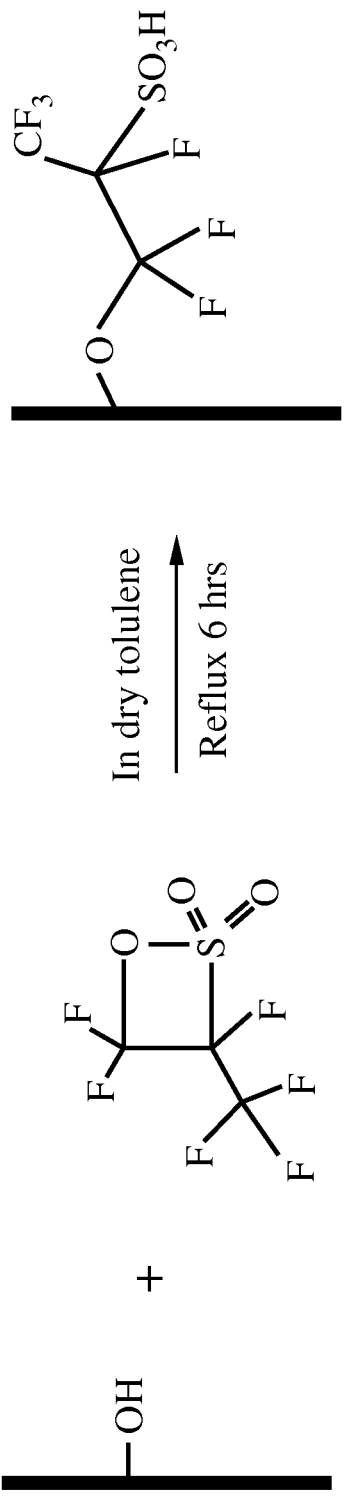
FIG. 6 depicts the perfluorosulfonic-acid grafting reaction according to the present invention.

Similarly, correlated signal intensity in the $^{27}Al\{^{1}H\}$ HETCOR spectrum in FIG. 5 shows evidence of strong dipole-dipole couplings between the six-coordinated aluminum sites and water protons. Specifically, cross-peaks associated with chemical shift correlations between the protons of water and the tetrahedral or octahedral $^{27}$Al species are clearly visible in FIG. 5. The corresponding experimental conditions are: 10 kHz spinning rate, 3.4 μs 90° $^{1}$H pulse, 1 s recycle delay, and 1048 scans for each of the 64 $t_1$, increments.

Once a hydrophilic membrane has been formed, ion-conducting groups are grafted onto the pore surfaces to create ion-conducting networks through the film. One example of this idea involves perfluorosulfonic acid precursor species reacting with the hydroxyl groups on the surface of aluminosilica pores according to the reaction shown in FIG. 6. The reaction is carried out in anhydrous toluene under a nitrogen atmosphere at 90° C. for six hours.

Figure 7:
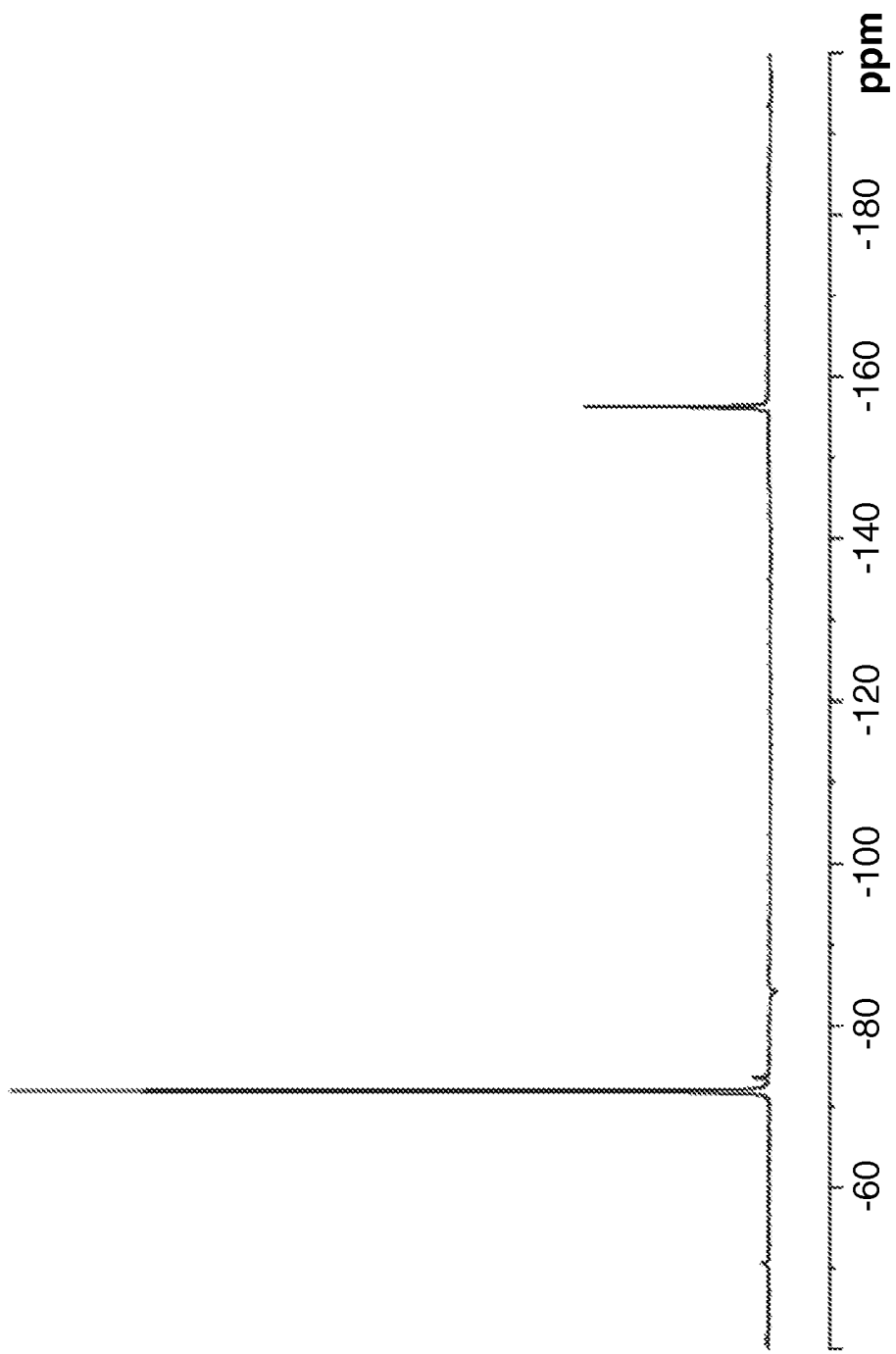
FIG. 7 is a single-pulse $^{19}F$ MAS NMR spectrum of a perfluorosulfonic-acid-grafted aluminosilica film.
Figure 8A:
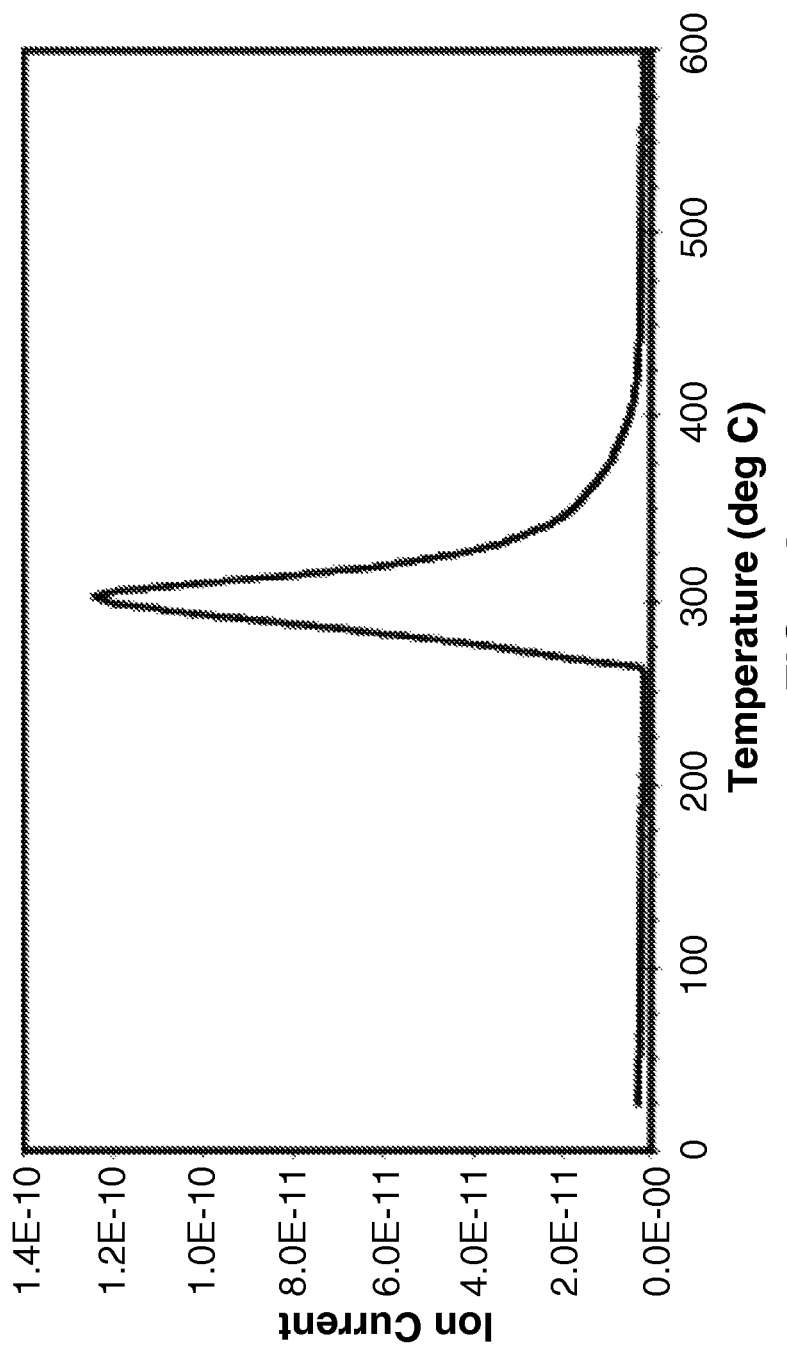
Figure 9A:
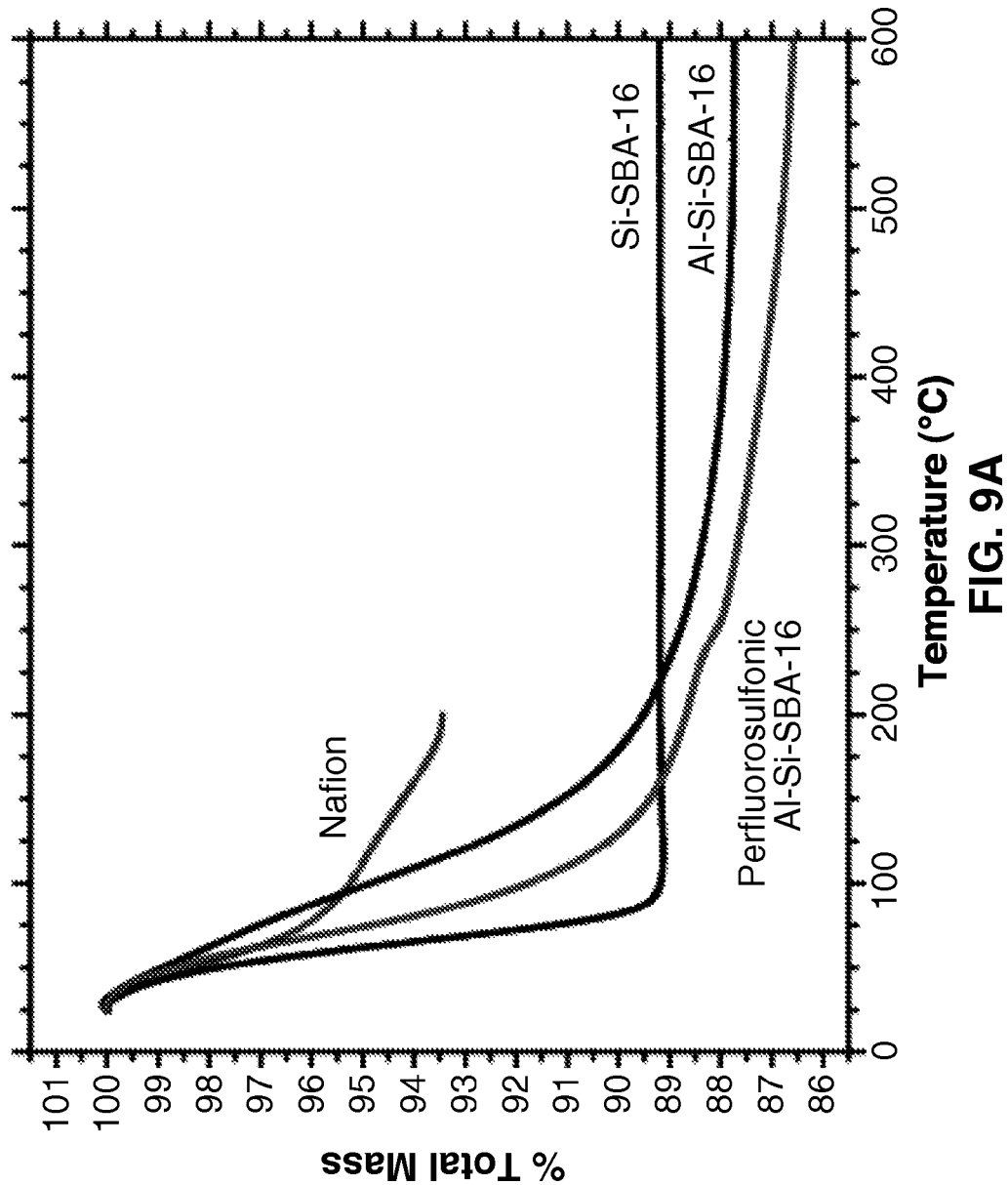
FIG. 9A is a thermogravimetric analysis of Nafion® 117, mesoporous silica (Si-SBA-16), mesoporous aluminosilica (Al—Si-SBA-16), and perfluorosulfonic acid grafted aluminosilica.
Figure 9B:
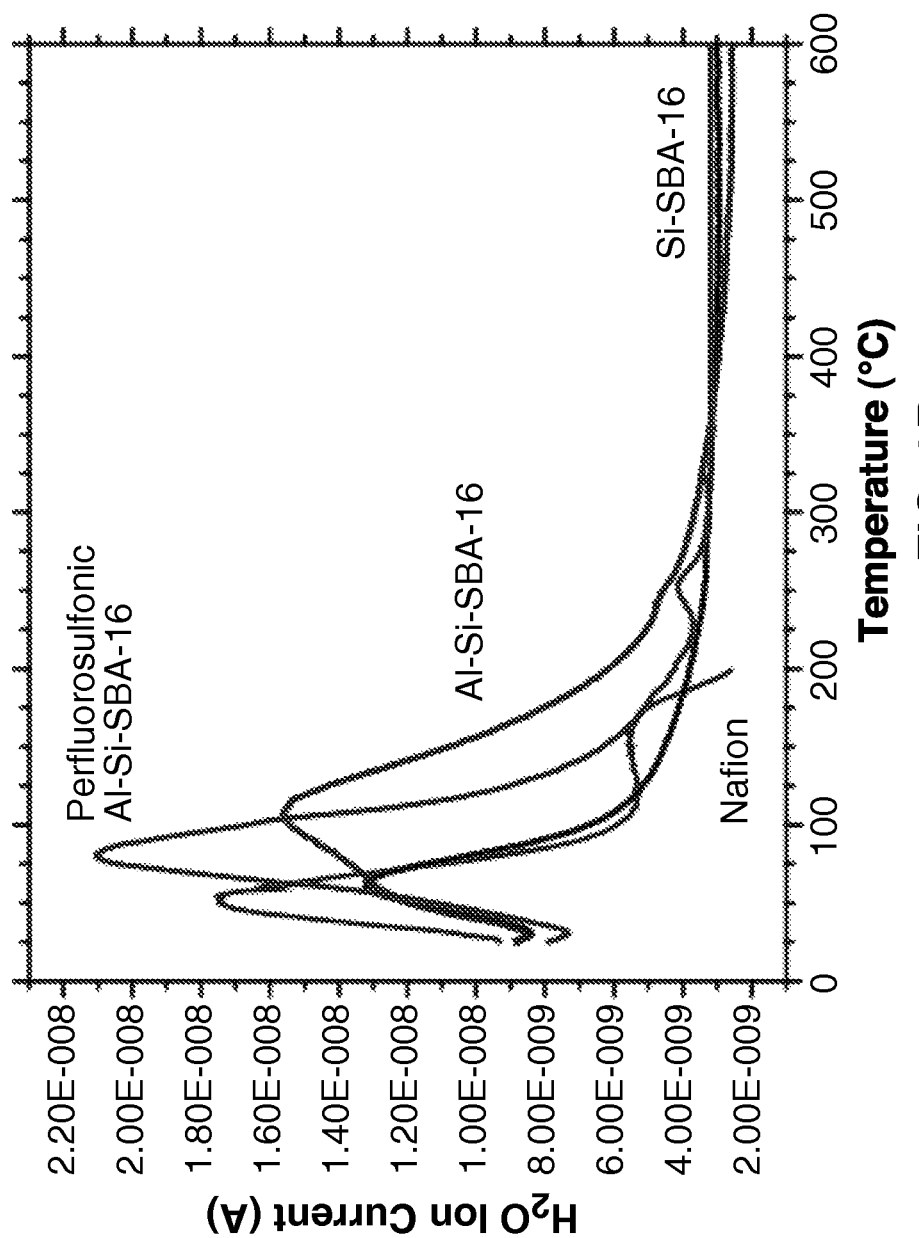
FIG. 9B is a mass spectrometry analysis of the water released in the TGA exhaust stream for the materials shown in FIG. 9A.

In this example, loadings of up to 6 wt % perfluorosulfonic acid groups in the aluminosilica films have been obtained. The chemical shifts in the $^{1}D$ $^{19}F$ MAS NMR spectrum of the acid grafted aluminosilica, shown in FIG. 7, are −74 ppm and −159 ppm, which are assigned to —$CF_3$ and —CF groups, respectively. These are shifted away from the values of −76 ppm, −90 ppm, and −84 ppm for the —$CF_3$, —$CF_2$, and —CF groups, respectively, in the perfluorosultone precursor. This indicates that the perfluorosultone has undergone the ring-opening reaction. Confirmation of the thermal stability of the grafted species is obtained by thermogravimetric analysis of the perfluorosulfonic-acid-grafted aluminosilica film. Mass spectrometry analysis of the TGA exhaust stream reveals that the acid groups do not decompose until 300° C. FIGS. 8A and 8B show the monitoring of the decomposition of the perfluorosulfonic acid groups by simultaneously detecting the ion currents for $SO_2$ groups (FIG. 8A) and for $CF_x$ groups, where x=1, 2, or 3 (FIG. 8B). Other ion-conducting species, such as triflic acid, phosphoric acid, or Nafion®, can also be added to the functionalized porous inorganic to further increase the ion-conducting species density in the film and improve the mechanical stability of the films.

The macroscopic properties of the porous inorganic films, such as water retention or proton conductivity, can be enhanced by the introduction of functionalities on the pore surfaces. For instance, thermogravimetric analysis combined with mass spectrometry in FIG. 9A clearly shows the influence of aluminum incorporation into the silica pores on water retention. Furthermore, the mass spectrometry data in FIG. 9B indicate that in the aluminosilica membrane, over half the water is retained to 100° C., compared to 60° C. for Nafion 117® and 55° C. for the silica film.

Figure 10:
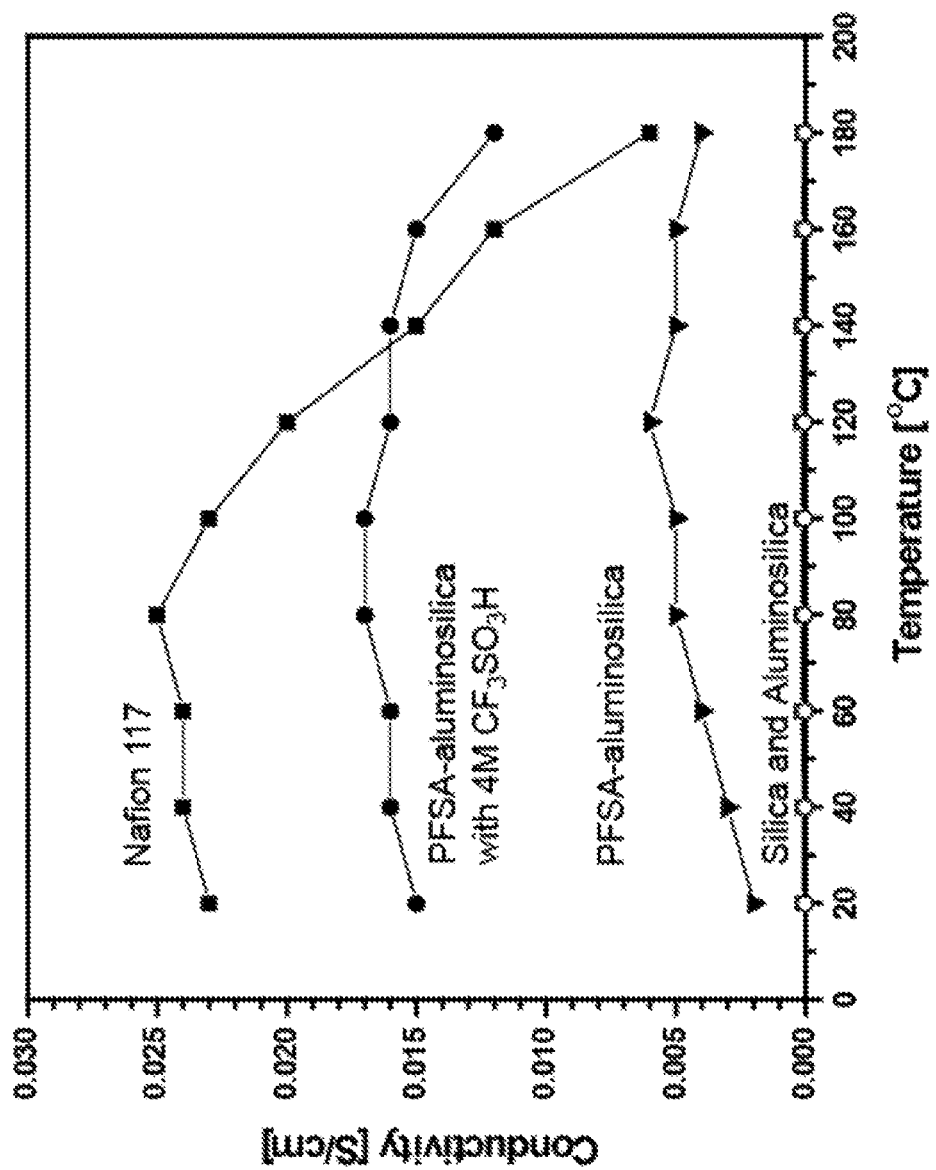
FIG. 10 shows proton conductivity measurements as a function of temperature at 50% relative humidity for Nafion® 117 and different 62 nm thick films of functionalized mesoporous cubic SBA-16 silica.

Just as the addition of hydrophilic species significantly increases the water retention, the addition of ion-conducting groups to the porous inorganic drastically increases the ion conductivity of the material. For example, without the presence of perfluorosulfonic-acid groups the silica and aluminosilica films have conductivities of $\sim 10^{-4}$ S/cm under fully hydrated conditions. However, FIG. 10 shows the improved temperature tolerance of the proton conductivity for various functionalized porous aluminosilica films. The functionalized films shown in FIG. 10 are calcined silica and aluminosilica-grafted; perfluorosulfonic-acid—(PFSA) and aluminosilica-grafted; and PFSA-aluminosilica-grafted, treated with 4M $CH_3SO_3H$ (aqueous triflic acid). All films were initially treated with deionized water.

The as-synthesized perfluorosulfonic acid grafted aluminosilica films have conductivity values of $\sim 1 \times 10^{-3}$ S/cm, but after ion-exchanging in sulfuric acid to protonate most of the acid sites, the conductivity increases to $5 \times 10^{-3}$ S/cm. If additional ion-conducting species, such as triflic acid, are introduced into the ion-exchanged, porous film, conductivity values up to $1.2 \times 10^{-2}$ S/cm have been obtained. While these values are below those of Nafion 117® at temperatures below 100° C., the conductivities approach each other as the operating temperature increases to 130° C., with substantial prospects for optimization and improvement, such as through increasing concentrations of the acidic and hydrophilic functional groups.

Example

Mesoporous Silica Film Preparation

Mesostructured silica films with 3D cubic structures are synthesized at room temperature with an acidic sol-gel solution containing amphiphilic poly(ethylene oxide)-b-poly (propylene oxide)-b-poly(ethylene oxide) triblock copolymer species as structure-directing agents for the polymerization of the metal oxide. A sol-gel solution containing the PEO-PPO-PEO triblock copolymer species, soluble metal oxide precursors, acid, water, and ethanol solvent is prepared in a similar fashion to that reported by Zhao and co-workers. The reaction solution composition typically consists of 1 tetraethyoxysilane (TEOS):$4 \times 10^{-3}$ $EO_{106}PO_{70}EO_{106}$: 5 $H_2O$:0.003 HCl:20 ethanol in molar ratio. The triblock copolymer molar ratio quantity can be adjusted between 3 and 12 and still yield the cubic mesophase. Actual reaction quantities are selected to produce about 1-5 g of dried, mesostructured block copolymer/silica material, but reaction solutions can easily be scaled up to larger quantities. The pH of the solution is adjusted to 1.5 by the addition of HCl because the hydrolysis of TEOS under acidic condition (pH <2) leads to silica cations that strongly interact with the PEO segments of the triblock copolymer micelles. Thin films are prepared by dip-coating a substrate into the block copolymer containing sol-gel solution at a pull-rate of 10 cm/min. The ethanol evaporates rapidly (~10 s) and mesostructural ordering of the block copolymer and polymerization of the hydrolyzed TEOS occurs simultaneously. The thin films are allowed to completely dry for 24 hours at 25° C. Free-standing films are formed by pouring the solution into a plastic Petri dish, and the ethanol evaporates at 25° C. over 48 hours. The resulting silica composite films are calcined at 550° C. in air for 8 hours to yield mesoscopically ordered silica.

Functionalization of the Mesoporous Silica Film

The mesoporous silica film is used as a parent material to produce a hydrophilic mesostructured aluminosilica film. The incorporation of grafted alumina species into or onto the interior pore surfaces of the silica framework yields a material containing hydrophilic pores. If tetrahedrally coordinated $Al^{3+}$ species are incorporated into the silica framework, then Brønsted acid sites specifically result. Introduction of Al sites is achieved by gently stirring 0.5 g of mesoporous silica film in a solution containing 0.5 g of $NaAlO_2$ in 50 mL of deionized water. The alkaline reaction mixture (pH~11.5) is heated at 80° C. for 9 hours in a sealed Nalgene bottle. The resulting aluminosilica film is filtered and washed in deionized water. The sodium ions in the sample that counter-balance the negative charges of the aluminum Brønsted acid sites are removed by ion-exchanging the film in 0.5 M $H_2SO_4$ heated to 60° C. for 15 minutes. Finally, the ion-exchanged aluminosilica films are dried for 12 hours at 135° C.

Perfluorosulfonic acid species are grafted to the dried aluminosilica film. 1.0 g of dried aluminosilica is added to 50 mL of anhydrous toluene under a $N_2$ atmosphere. 3.0 g of perfluorosultone are syringed into the mixture with gentle stirring. The reaction mixture is refluxed at 90° C. for 6 hours. The acid-functionalized aluminosilica is vacuum-filtered, washed with toluene, and dried under vacuum at 60° C. for ~12 hours. Finally, the remaining mesopore volume is filled with additional acid containing species, such as triflic acid, to improve the proton-conducting capacity, reduce fuel crossover in the membrane, and improve the mechanical properties of the membrane. The perfluorosulfonic acid aluminosilica films are immersed in a concentrated solution of the acid species under $N_2$ atmosphere, removed after 1 hour, and washed with deionized water to remove the excess acid along the exterior film surfaces.

Substantial versatility exists with respect to the compositions and structures of the ion-conducting materials described here. A variety of inorganic frameworks can be used, including, but not limited to, inorganic oxides, semiconducting solids, or metals, which can be processed into film, fiber, powder, or monolithic structures with ordered arrays or non-ordered (for example, worm-like) channels. The main requirement is that interchannel connectivity exists along the direction(s) of desired ion transport. Inorganic materials with molecular-, nano-, meso-, micro-, and/or macroscale channel dimensions, both alone and in combination, can be used. The types of molecular moieties that can be incorporated into the channels to modify the 'functional' properties of the materials are similarly diverse and numerous. For example, a variety of functional (e.g., hydrophilic, hydrophobic, ion-conducting, reactive, or optically responsive) species can be incorporated into porous inorganic or composite films, which expands the type and number of potential applications of these materials. Other organic species including, but not limited to, perfluoroalkyl sulfonic acid molecules (e.g., trifluoromethane sulfonic acid (triflic acid), nonafluorobutane sulfonic acid, and nonafluorooctane sulfonic acid), organic species containing phenyl groups or unsaturated carbon bonds, and fullerenes, phosphoric acids, ion-conducting polymers (e.g., Nafion®, DuPont) can be grafted or used to fill the pore volume of the inorganic. As an example, enhanced stability and solvent-barrier properties are anticipated for the grafted or larger molecular weight acidic filler species. The "pore volume" refers to the space within the pore bounded by the pore/channel surfaces to which the hydrophilic or ion-conducting species is attached.

Furthermore, inorganic ions, such as lithium, can also be introduced for battery or other applications. Due to differences in properties (e.g., viscosity, vapor pressure, etc.) of different ion-conducting or other functional species, dilution in a volatile or non-aqueous solvent may assist incorporation. Optimal conditions for incorporating the ion-conducting species will vary according to macroscopic properties and device performance sought, including ion conductivity, mechanical stability, and fuel cross-over resistance in the functionalized porous inorganic films. For example, pH, temperature, and time of the functionalization reactions (e.g., alumination) can be adjusted to modify the concentration of hydroxyl groups along the mesopore surfaces in silica films. Hydroxyl groups can be used to graft additional perfluorosulfonic acid species to increase the density of the hydrophilic or ion-conducting moieties within the mesopore network. Another modification of the synthesis to improve the acid grafting density is to repeat the perfluorosulfonic-acid-grafting reaction step multiple times.

Functionalized hydrophilic inorganic materials present a potential solution to the problem of proton exchange membrane dehydration and subsequent loss of proton conductivity in PEM fuel cells operated at temperatures above 100° C. The versatility of low temperature sol-gel synthesis methods allows for inexpensive formation of inorganic oxides, such as silica. Furthermore, by incorporating structure-directing agents into the synthesis solution, porous inorganic materials are possible. These interconnected pore networks in the inorganic provide potential conduction pathways through the material. Combined with the fact that ethanol based sol-gel solutions are readily formed into film morphologies of various thicknesses, these properties indicate that porous inorganics are suitable membrane materials through which transport may occur. In particular, if the pore networks are functionalized by ion-conducting species, such as perfluorosulfonic acid, ion conduction occurs through the films. The primary advantage over current state-of-the-art polymer-based proton exchange membranes is that the acid-functionalized inorganic films through which proton conduction occurs retain robust channels with significantly greater hydrophilicity at temperatures above 100° C. and thus maintain stable proton conductivity values well above 100° C.

Although the description above contains many details, these should not be construed as limiting the scope of the invention, but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of functionalizing a porous inorganic material, comprising:
    introducing ion-conducting species to pore surfaces in the porous inorganic material; and
    coupling the ion-conducting species to the pore surfaces;
    wherein said coupled ion-conducting species create ion-conducting networks; and
    repeating the steps of introducing and coupling the ion-conducting species to the pore surfaces at least twice.

2. A method as recited in claim 1, wherein said ion-conducting species is an acid-containing species.

3. A method as recited in claim 1, wherein the porous inorganic material is a film, a fiber, a powder, or a monolith having channel cross section dimensions that are greater than 2 nm.

4. A method as recited in claim 3, wherein said channel dimensions are in the mesoscopic size regime between 2 nm and 50 nm.

5. A method as recited in claim 1, wherein multiple types of ion-conducting species are introduced and coupled to pore surfaces during successive repeating steps.

\* \* \* \* \*